United States Patent [19]

Bradshaw et al.

[11] Patent Number: 5,218,546

[45] Date of Patent: Jun. 8, 1993

[54] FREQUENCY SHAPING METHOD FOR MINIMIZING IMPACT HARSHNESS OF SUSPENSION SYSTEM

[75] Inventors: Thomas B. Bradshaw, Canoga Park; Han-Shue Tan, Northridge, both of Calif.

[73] Assignee: Hughes Aircraft Company, Los Angeles, Calif.

[21] Appl. No.: 628,046

[22] Filed: Dec. 17, 1990

[51] Int. Cl.⁵ ............................................. B60G 17/08
[52] U.S. Cl. .................. 364/424.05; 280/707
[58] Field of Search ............... 364/424.05, 424.01; 280/707, 708

[56] References Cited

U.S. PATENT DOCUMENTS

| | | | |
|---|---|---|---|
| 4,984,820 | 1/1991 | Uchiyama et al. | 280/707 |
| 5,033,770 | 7/1991 | Kamimura et al. | 280/707 |
| 5,062,660 | 11/1991 | Satoh et al. | 280/707 |
| 5,075,855 | 12/1991 | Sugasawa et al. | 364/424.05 |
| 5,097,419 | 3/1992 | Lizell | 364/424.05 |

Primary Examiner—Thomas G. Black
Attorney, Agent, or Firm—C. D. Brown; R. M. Heald; W. K. Denson-Low

[57] ABSTRACT

An active suspension system is disclosed for a motorized vehicle and the like. Generally these types of active suspension systems have an impact harshness to sharp road irregularities higher than that of passive suspension systems. This invention incorporates a frequency response shaping network (42) which alters the frequency signal from a hub sensor (36) by analyzing the frequency signal in view of its components of magnitude and phase, and shaping these components into a desired form. The modified or shaped signals are then applied to the basic control laws of the vehicle dynamics to modify the damping signal applied to an active actuator (38) in such a way that the actuator (38) applies the appropriate damping to the vehicles wheels (32) with greatly reduced harshness.

17 Claims, 4 Drawing Sheets

FREQUENCY SHAPING METHOD FOR MINIMIZING IMPACT HARSHNESS OF SUSPENSION SYSTEM

BACKGROUND OF THE INVENTION

1. Technical Field

This invention relates generally to an active suspension system, and more specifically, to an apparatus and method for an active vehicle suspension system incorporating frequency shaping characteristics to reduce impact harshness.

2. Discussion of the Related Art

Active suspension systems which exhibit suspension control over a wide bandwidth of disturbance frequencies are known to those skilled in the art. These prior art active suspension systems generally exhibit a substantially harsher impact characteristic than their original passive counterpart systems. Specifically what this means is that when a machine incorporating the suspension system, such as a vehicle, encounters a sharp disturbance, the forces transmitted to the machine are larger and exhibit higher frequency content than would be transmitted to the machine if a passive system were incorporated. Therefore, there is a trade off between the known advantages of the active system, such as higher stability and handling in a vehicle, and the reduced impact harshness of a passive system.

One method known in the art to reduce the impact harshness of an active suspension system of a vehicle is to reduce the hub or wheel damping. Unfortunately, this generally leads to unacceptable wheel damping well before a harshness characteristic comparable to the passive system can be achieved. This relationship is shown in FIG. 1 for a particular active and passive suspension system. The horizontal axis of FIG. 1 represents the hub damping as an undimensioned relationship of the time the wheel takes to stop oscillating after it encounters a road irregularity. As can be seen, the higher the hub damping the better wheel control is available, and thus the better the handling of the vehicle. As the hub damping decreases, the wheel bounce increases and the control and handling of the vehicle becomes more difficult and possibly unsafe. The vertical axis represents the peak-to-peak body load as the amount of force being transmitted to the vehicle from the suspension system. An increase in body load translates to an increase in harshness upon impact of a road irregularity.

Solid line A represents the relationship between body load and hub damping for a specific vehicle having an active suspension system. Dashed line B represents the relationship between hub damping and body load for a particular vehicle having a passive suspension system. As can be seen, a reduction in hub damping reduces the harshness of a particular road disturbance. However, it is apparent from curves A and B that the hub damping cannot be reduced enough in the active system to achieve comparable impact harshness to that of the passive system before getting into a region of unreasonable wheel bounce. Unreasonable wheel bounce being defined as a factor of driver discomfort and/or loss of vehicle control. Therefore, this method of reducing the hub damping has met with limited success.

Another method to attempt to reduce the impact harshness of an active suspension system is the use of soft isolator bushings, as shown in FIG. 2. In that figure, two devices for inducing wheel damping are shown between a sprung mass 10 and an unsprung mass 12. For visual purposes the sprung mass could be the body of a particular vehicle and the unsprung mass could be one of the vehicles wheels. The two wheel damping devices are a variable control damper 16 and an active actuator 18. Damper 16 can either be incorporated into a passive or active system and actuator 18 is generally used in an active system. A spring 14 is generally used in both a passive or active system to further increase suspension control. Two soft isolator bushings shown generally at 20 have been incorporated in conjunction with both damper 16 and active actuator 18 between the sprung mass 10 and the unsprung mass 12.

Soft isolator bushings 20 help reduce impact harshness due to smaller impacts, as well as high frequency (noise) transmission of road disturbances which would be too small to be damped by wheel damping devices 16 and 18. However, to maintain proper wheel damping in a suspension system incorporating soft isolator bushings 20, higher peak damping forces are required. As described above for FIG. 1, higher damping forces results in increased transmission of larger single road disturbances, which results in increased impact harshness. In addition, a soft isolator bushing requires substantial bushing travel to prevent the bushing from encountering the bushing travel limits at too low of a load. Further, an isolator bushing creates a bushing induced phase lag in the damper due to the up and down movement of the damper shifted in time from the up and down movement of the rest of the suspension system. As a practical matter, however, isolator bushings are required for both passive and active suspension systems to reduce noise disturbances to the vehicle chassis, and the performance characteristics which result from the isolator bushings for both systems are similar.

What is needed then is an apparatus and method for reducing impact harshness of an active suspension system and further, compensating for the undesirable effects of an isolator bushing and other system dynamics, including bushing induced phase lag, while allowing for independent control of hub damping and high frequency transmission characteristics. It is therefore an object of the present invention to provide such a method and apparatus.

SUMMARY OF THE INVENTION

Disclosed is a method and apparatus for incorporating an active suspension system with means for reducing the impact harshness caused by sharp disturbances. The system includes a motion sensor which may be, but is not limited to, a hub accelerometer. The motion sensor senses the motion of an unsprung mass and transmits a frequency signal indicative of this motion to a microprocessor. The microprocessor includes an encoded frequency shaping algorithm which shapes the frequency signal from the sensor to a signal having modified phase and magnitude components. The shaped signal is sent to an active control component such as an active hydraulic strut or damper, to provide proper damping. The shaped signal instructs the active damping component to adjust the damping to a value which will minimize impact harshness.

By this invention the individual wheels of a vehicle, such as a car, truck, bus, tank, aircraft, or motorcycle can be individually controlled to provide higher degrees of stability and performance, and further, reduce the amount of impact harshness as a result of sharp road irregularities. In addition, induced phase lag due to the isolator bushings and other system dynamics is compensated for.

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiment of the present invention is merely exemplary in nature and is in no way intended to limit its uses or applications.

Figure 2:
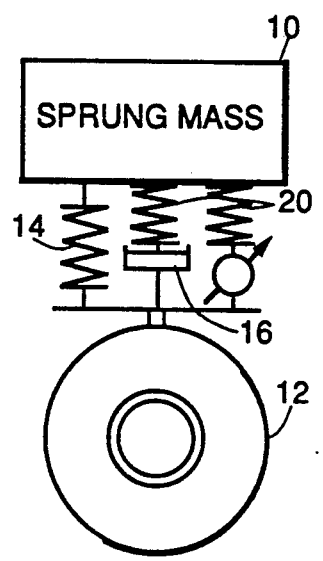
FIG. 2 is a diagram of certain suspension components shown in relationship to a sprung mass and an unsprung mass.
Figure 3:
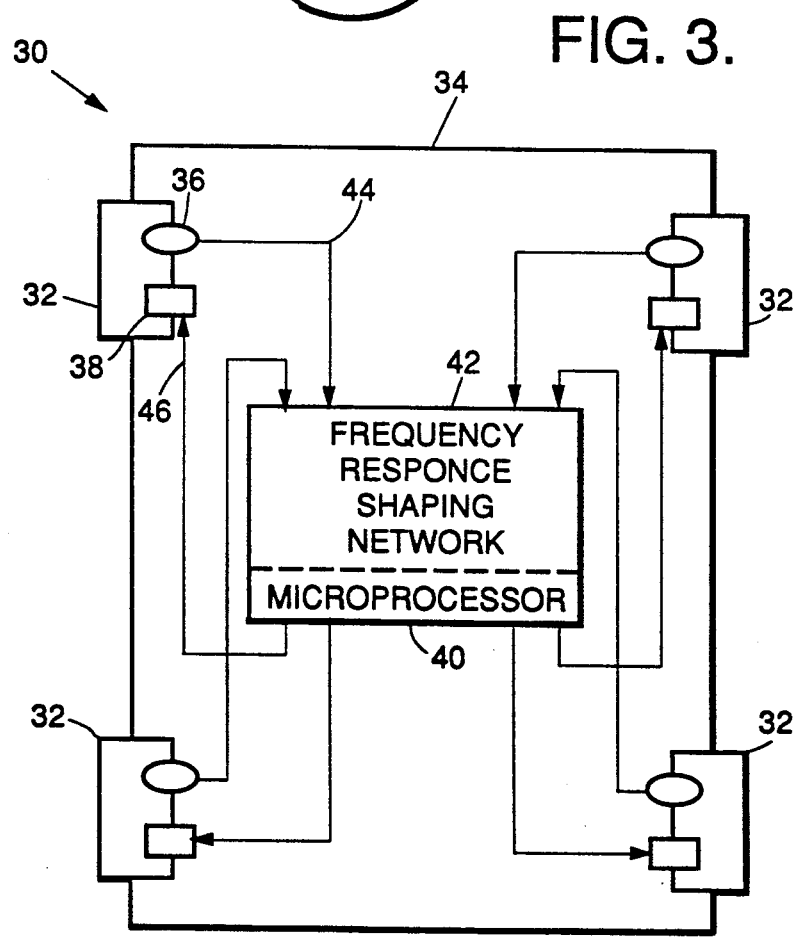
FIG. 3 is a schematic of the components of a first preferred embodiment of the invention.

FIG. 3 represents a schematic of a particular use of a preferred embodiment of the present invention. In that figure, generally shown at 30 is an actively controlled suspension system of a vehicle. Reference numerals 32 represent the tires of the vehicle as unsprung masses. Reference numeral 34 represents the body of the vehicle as a sprung mass. The relationship between the unsprung mass and the sprung mass can be visualized in FIG. 2 as described above. Each unsprung mass 32 has a sensor 36 and an actuator 38. Sensor 36 can be a hub accelerometer for measuring the acceleration of the unsprung mass 32. Sensor 36 is not, however, limited to an accelerometer, and can be any other device which measures the motion of the hub, such as a velocity meter. Actuator 38 is an actively controlled actuator which provides a wide range of damping to the hub. Actuator 38 can be a hydraulic strut or a damper with an actively controlled orifice, but is not limited to these devices. Sensor 36 and actuator 38 can virtually be any appropriate component known in the art.

System 30 further includes a microprocessor 40 or other applicable computing device. Incorporated within microprocessor 40 is a frequency response shaping network 42. Frequency response shaping network 42 has an input line 44 taken from each sensor 36. Further, microprocessor 40 has an output line 46 connected to each actuator 38. Each unsprung mass 32 includes similar output lines 44 to the frequency response shaping network 42 and further each actuator 38 includes an input line 46 from the microprocessor. Generally, each actuator and sensor will be identical for each hub of the vehicle, however, different systems may require different sensors and actuators for desired results, and therefore different actuators and sensors may be used since each wheel may respond separately to certain road situations in relationship to the vehicle chassis.

In operation, sensor 36 senses the motion of unsprung mass 32. This motion will generally be up and down for system 30. A frequency signal indicative of this motion is sent along lines 44 to frequency response shaping network 42. Frequency response shaping network 42 takes the frequency signal on line 44 and analyzes it in view of its components of phase and magnitude. Frequency response shaping network 42 then takes these individual components of phase and magnitude and shapes them by means of a predetermined algorithm stored in microprocessor 40. The shaped signal from frequency response shaping network 42 is applied to an output of microprocessor 40 along line 46 to apply the appropriate damping response to actuator 38. Therefore, actuator 38 applies the desired and appropriate damping to unsprung mass 32 in view of the movement of upsprung mass 32. The shaped damping response is applied to unsprung mass 32 such that the impact harshness due to a road irregularity which caused the sensor to react is minimized.

Figure 4:
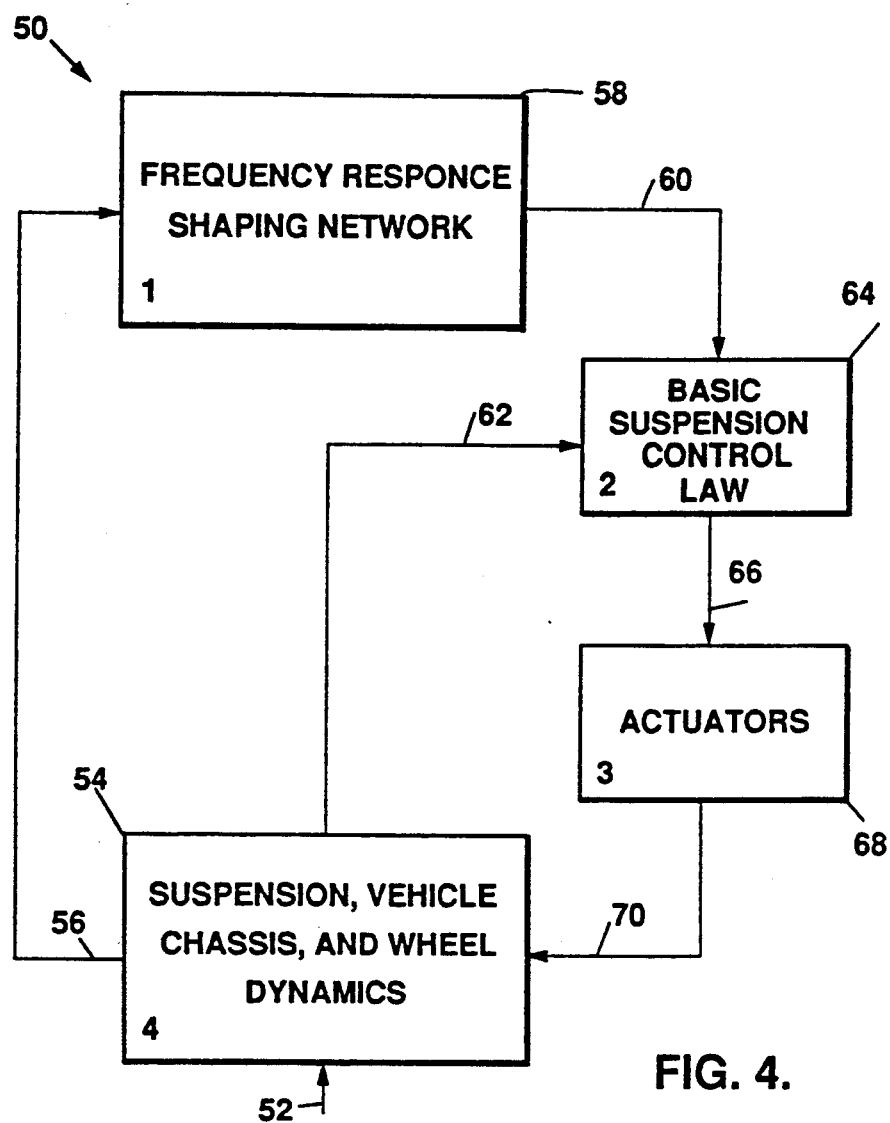
FIG. 4 is a flow chart of the operation of a first preferred embodiment of the invention.

Now turning to FIG. 4, a functional block diagram of an active suspension system as may be used in system 30, according to a preferred embodiment of the present invention is shown generally at 50. Block 54 represents certain dynamics of individual parts of the vehicle which may be affected by a road irregularity. These dynamics include, but are not limited to, suspension, vehicle chassis and wheel dynamics. Line 52 represents an input to system 50, and is generally an input such as that which would be caused by a chuck hole or the like in the road. Line 56 represents an output line of the dynamics block 54. The output on line 56 would be an output from sensor 36 of FIG. 3, and would carry a frequency signal indicative of the response of the vehicle chassis, suspension and wheel relative to the magnitude of the signal on input line 52. The frequency signal on line 56 is applied to a frequency response shaping network represented by block 58. Frequency response shaping block 58 takes the frequency signal on line 56 and analyzes it in view of its components of amplitude and phase as discussed above. These components are then applied to a predetermined algorithm to modify and shape the phase and magnitude of the frequency signal to a predetermined response frequency signal relative to the input components of phase and amplitude on line 56. This response is outputted on line 60 to a basic suspension control law block 64. Control law block 64 includes the control laws of the different dynamics of the vehicle. Also applied to control law block 64 as an input on line 62 is the dynamics information from block 54. Control law block 64 takes the dynamic response signals from block 54 and applies the modified frequency signal from block 58 to determine the appropriate damping of the hub to reduce impact harshness. The frequency response shaping network and basic suspension control laws would be stored in microprocessor 40. Microprocessor 40 computes the proper responses to the known characteristics from the control laws of the dynamics of the vehicle. The signal indicative of the appropriate damping is applied to an actuator represented by block 68 on line 66. The actuator as represented by block 68 then applies actuation to the dynamics of the vehicle of block 54 along line 70. By this, the motion of the wheel is controlled to minimize impact harshness depending on the impact represented on input line 52.

Figure 5:
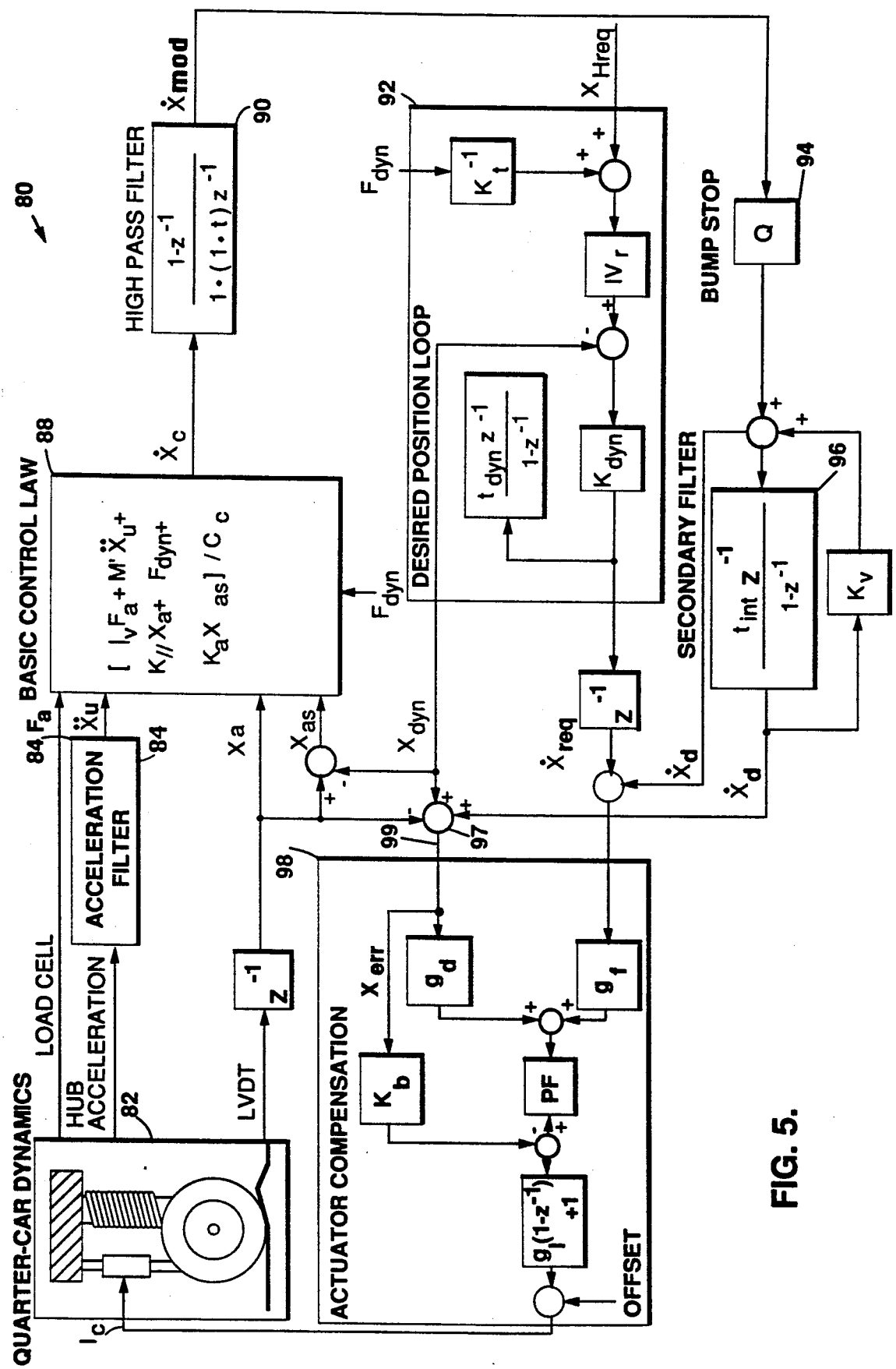
FIG. 5 is a flow chart of a specific operation of a suspension system according to a preferred embodiment of the present invention.

FIG. 5 represents a specific implementation of an active suspension system 80 for a vehicle in which a hub accelerometer output is applied to a frequency response shaping network represented by acceleration filter 84 instead of the traditional gain amplification network for known active suspension systems. System 80 has a quarter car dynamics block 82 which includes the motion sensing and control of one wheel of a vehicle. Outputs of block 82 includes a load cell line $F_a$ which represents a force measurement on the suspension system, a hub accelerometer line which represents the acceleration of the up and down motion of the wheel, and an LVDT sensor line $X_a$ which represents the position of the wheel relative to the chassis. The output from the load cell $F_a$, the acceleration filter 84 representing the frequency response shaping network $\ddot{X}_u$, and position sensor $X_a$ are applied to a basic control law block 88 for providing the frequency shaped signal to the dynamics of the different components of the suspension system.

The remaining components and functions are of a known active suspension control system and are incorporated merely as an example. Other systems and methods could be used. The output $X_c$ of block 88 is applied to a high pass filter block 90 represented by a transfer function shown in block 90. The output $X_{mod}$ of high pass filter block 90 is applied to a bump stop 94 and then to a secondary filter 96 as shown. The combination of the position on line $X_a$ and the desired position determined by block 92, and the output from basic control law block 88 (after being filtered by the high pass and secondary filters) are applied to a summing junction 97, and applied via line 99 to an actuator compensation network represented by block 98. Block 98 determines the compensation of the actuator dynamics to improve its response to the commands. The output of actuator compensation block 98 is applied to the dynamics block 82 on line $I_c$. Therefore the actuator is adjusted appropriately to apply the proper damping to the wheel to minimize the harshness.

Figure 6:
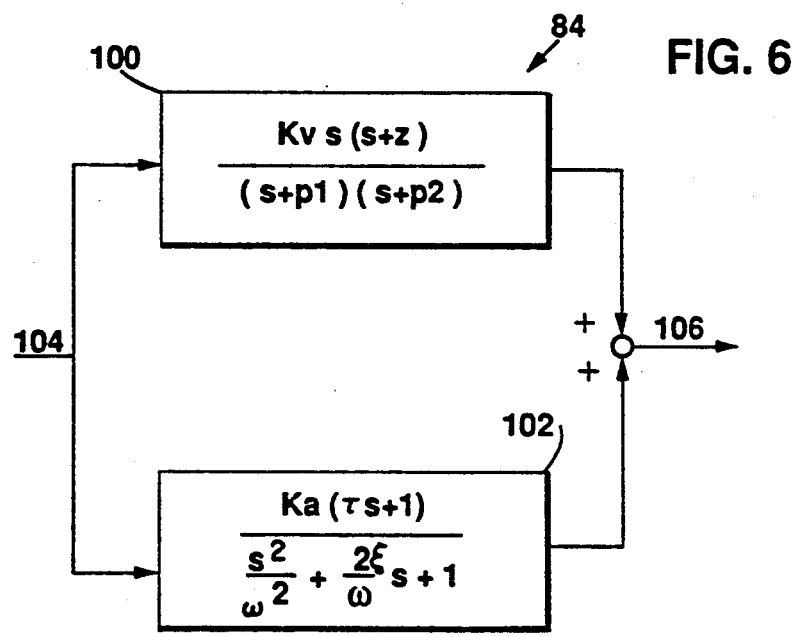
FIG. 6 is a flow chart diagram of one component of a preferred embodiment of the present invention.

The frequency response shaping network incorporated as acceleration filter 84 for shaping the frequency output of the hub accelerometer provides one of the best means for shaping the frequency response to perform the desired damping. One method of filtering the frequency signal by the acceleration filter block 84 is shown in FIG. 6 in a dual block format type. The input on line 104 from the hub accelerometer is applied to the blocks 100 and 102 having the specific transfer functions as shown within the blocks. In this example, Kv is a constant; S is the Laplace variable; Z is the break frequency of the phase lead term; p1 and p2 are the break frequencies of the phase lag terms; $\tau$ is the reciprocal of the break frequency of a phase lead term; and $\omega$ is the natural frequency and $\xi$ the damping ratio of a second order rolloff. These transfer functions would be stored in microprocessor 40. Other transfer functions for other desirable frequency shaping characteristics could be stored in microprocessor 40. The output of blocks 100 and 102 are combined to form an output 106 which is applied to the basic control law block 88 in FIG. 5.

Figure 1:
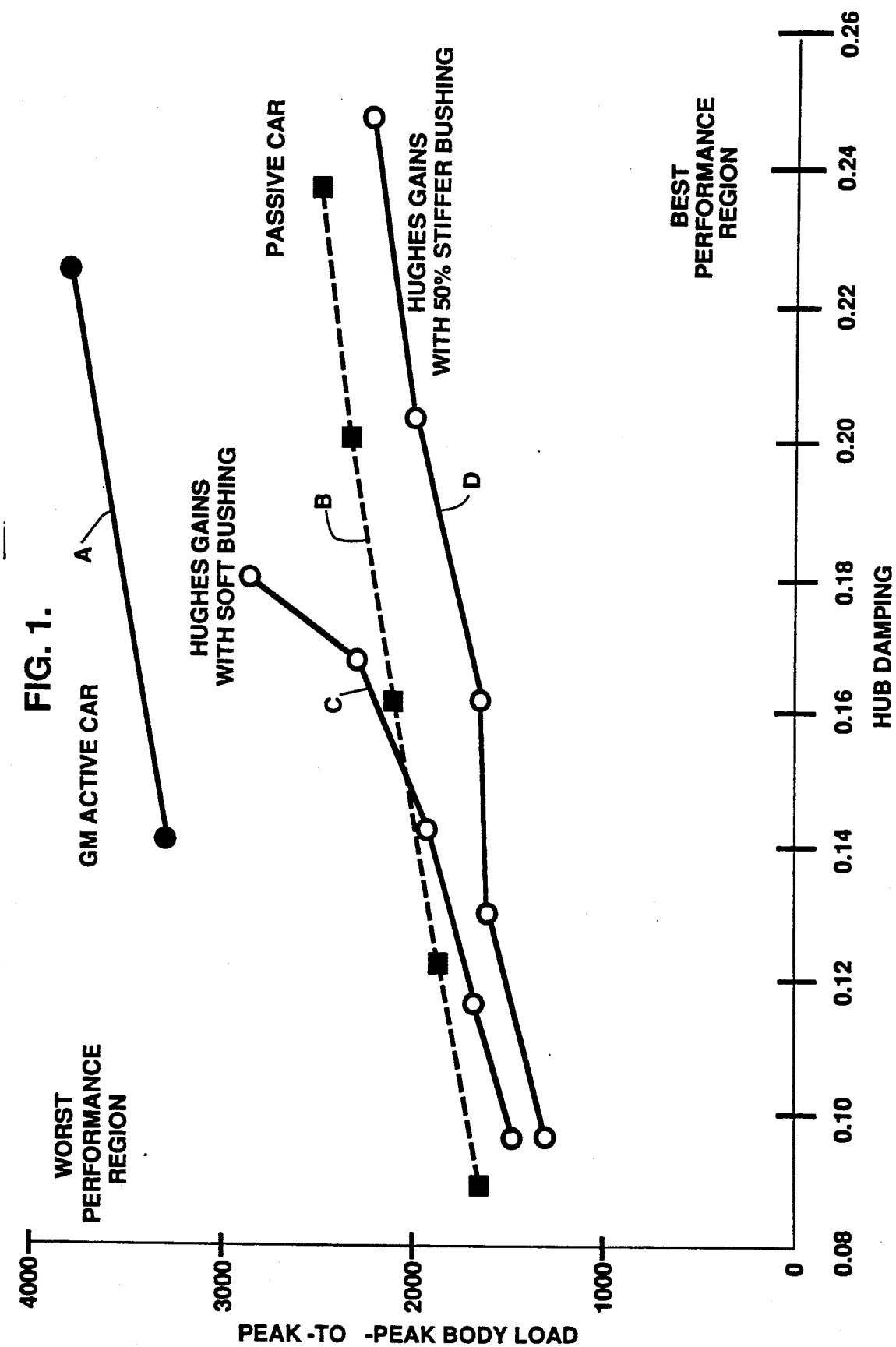
FIG. 1 is a plot of body load to hub damping for particular suspension systems.

Applying these frequency shaping characteristics to the vehicle control law dynamic equations enables the characteristic curve between hub damping and body load as shown in FIG. 1 to have a more desirable impact harshness. As can be seen in FIG. 1, line C represents the response curve between hub damping and body load of a suspension system according to a preferred embodiment of this invention incorporating an isolator bushing 20 having a stiffness which is relatively soft or has lower damping. As is apparent the harshness of the system has been reduced from prior art active suspension systems as shown by line A. Incorporation of a stiffer isolator bushing (50% stiffer than line C) which is comparable to a passive suspension bushing, can realize performance characteristics as shown on line D. As is apparent, the impact harshness has been reduced to a degree which is even less than that of the passive system represented by line B.

The foregoing discussion discloses and describes a merely exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A system for actively controlling the motion of an unsprung mass relative to a sprung mass comprising:
   a motion sensor for measuring the motion of the unsprung mass relative to the sprung mass, said motion sensor operable to generate a signal of this motion;
   a frequency shaping network receiving the signal from the motion sensor, said frequency shaping network analyzing the signal in view of its phase and amplitude components and altering the phase and amplitude components based upon a predetermined response algorithm, said frequency shaping network further outputting a signal indicative of a shaped frequency signal; and
   an actively controlled actuator receiving the signal from the frequency shaping network, wherein the actuator controls the movement of the unsprung mass based upon the shaped signal from the frequency shaping network.

2. The system of claim 1 further comprising an isolator bushing wherein the isolator bushing and actuator are positioned between the unsprung mass and the sprung mass.

3. The system of claim 1 wherein the motion sensor is a hub sensor for measuring the motion of a wheel relative to a vehicle chassis and producing a frequency output indicative of this motion.

4. The system of claim 3 wherein the hub sensor is a hub accelerometer for measuring the acceleration of the wheel.

5. The system of claim 1 wherein the actively controlled actuator is a damper with an actively controlled orifice.

6. The system of claim 1 wherein the frequency shaping network is included in a microprocessor.

7. The system of claim 6 wherein the microprocessor includes basic control laws of particular vehicle dynamics.

8. A method of actively controlling an unsprung mass relative to a sprung mass comprising the steps of:
   sensing the motion of the unsprung mass and providing a frequency signal indicative of the motion;
   generating a shaped frequency signal in a frequency shaping network based on the motion of the unsprung mass, wherein the frequency shaping network analyzes the frequency signal in view of its phase and amplitude components and shapes the phase and amplitude components based upon a predetermined response algorithm; and
   applying the shaped frequency signal to an actuator for actively controlling the motion of the unsprung mass based upon the shaped signal, a frequency shaping network receiving the signal from the motion sensor, said frequency shaping network analyzing the signal in view of its phase and amplitude components and altering the phase and amplitude components based upon a predetermined response algorithm, said frequency shaping network further outputting a signal indicative of a shaped frequency signal; and an actively controlled actuator receiving the signal from the frequency shaping network, wherein the actuator controls the movement of the unsprung mass based upon the shaped signal from the frequency shaping network.

9. The method according to claim 8 wherein the motion of the unsprung mass is sensed by an accelerometer.

10. The method of claim 9 wherein the accelerometer is a hub accelerator for measuring the acceleration of a wheel relative to a vehicle chassis.

11. The method according to claim 8 wherein the frequency signal is shaped in a microprocessor.

12. The method according to claim 11 including the step of using the microprocessor to apply the shaped frequency signal to basic control laws of specific vehicle dynamics.

13. The method according to claim 8 wherein an actively controlled damper controls the motion of the unsprung mass.

14. A method of actively controlling a suspension system of a vehicle comprising the steps of:
   sensing the motion of a wheel of the vehicle and providing a frequency signal indicative of this motion;
   shaping the frequency signal in a frequency shaping network wherein the frequency shaping network separates the frequency signal into its phase and amplitude components and shapes the phase and amplitude components based upon a predetermined response algorithm in order to generate a shaped frequency signal; and
   applying the shaped frequency signal to an actuator operable to actively control the motion of the wheel.

15. The method of claim 14 further comprising the steps of storing basic control laws of vehicle dynamics in a computing device and applying the shaped frequency signal to the control laws to control the actuator according to the vehicle dynamics.

16. The method of claim 14 wherein the wheel motion is sensed by a hub accelerometer.

17. The method of claim 14 wherein the wheel is actively controlled by a damper with an actively controlled orifice.

* * * * *